(12) United States Patent
Farag et al.

(10) Patent No.: US 12,162,503 B2
(45) Date of Patent: Dec. 10, 2024

(54) METHOD FOR IMPROVING THE AVAILABILITY OF AN ENERGY STORAGE OR TRANSFORMATION SYSTEM OF A VEHICLE

(71) Applicant: VOLVO TRUCK CORPORATION, Gothenburg (SE)

(72) Inventors: Bassem Farag, Gothenburg (SE); Mark Hirche, Hisings Kärra (SE); Faisal Altaf, Västra Frölunda (SE)

(73) Assignee: VOLVO TRUCK CORPORATION, Göteborg (DE)

( * ) Notice: Subject to any disclaimer, the term of this patent is extended or adjusted under 35 U.S.C. 154(b) by 232 days.

(21) Appl. No.: 17/659,745

(22) Filed: Apr. 19, 2022

(65) Prior Publication Data

US 2022/0340151 A1    Oct. 27, 2022

(30) Foreign Application Priority Data

Apr. 23, 2021   (EP) .................................. 21170150

(51) Int. Cl.
*B60W 50/029*    (2012.01)
*B60L 3/00*      (2019.01)
(Continued)

(52) U.S. Cl.
CPC ......... *B60W 50/029* (2013.01); *B60L 3/0046* (2013.01); *B60L 58/13* (2019.02);
(Continued)

(58) Field of Classification Search
CPC ........... B60W 50/029; B60W 50/0205; B60W 2050/021; B60W 2050/0215;
(Continued)

(56) References Cited

U.S. PATENT DOCUMENTS 6,389,350 B1    5/2002   Fennel
7,173,396 B2 *  2/2007   Gunji ..................... B60K 6/485
                                                    320/132
(Continued)

FOREIGN PATENT DOCUMENTS

DE    102008040400 A1    1/2010
DE    102010045514 A1    3/2012
(Continued)

OTHER PUBLICATIONS

European Search Report dated Oct. 18, 2021 in corresponding European Patent Application No. 21170156.0, 8 pages.
(Continued)

*Primary Examiner* — Gertrude Arthur Jeanglaude
(74) *Attorney, Agent, or Firm* — Venable LLP; Jeffri A. Kaminski (57) ABSTRACT

A method for improving the availability of an energy storage or transformation, EST, system of a vehicle. The method comprises providing an EST system model of coupled EST components of the EST system, identifying a fault or error in an EST condition parameter of the EST system, estimating an output value of the EST condition parameter based on the EST system model, identifying a vehicle situation which, in case of an at least temporary lack of operability of the EST system, belong to a predetermined group of vehicle situations defined as hazardous, and in response to identifying the vehicle situation belonging to the predetermined group of vehicle situations defined as hazardous, operating the EST system despite the fault or error in the EST condition parameter using the estimated output value of the EST condition parameter based on the EST system model.

14 Claims, 3 Drawing Sheets

(51) Int. Cl.
*B60L 58/13* (2019.01)
*B60W 50/02* (2012.01)

(52) U.S. Cl.
CPC ...... *B60W 50/0205* (2013.01); *B60L 2200/36* (2013.01); *B60L 2260/42* (2013.01); *B60W 2050/021* (2013.01); *B60W 2050/0215* (2013.01); *B60W 2300/125* (2013.01); *B60W 2510/244* (2013.01)

(58) Field of Classification Search
CPC ....... B60W 2300/125; B60W 2510/244; B60L 58/13; B60L 3/0046; B60L 2200/36; B60L 2260/42
See application file for complete search history.

(56) References Cited

U.S. PATENT DOCUMENTS

| | | | |
|---|---|---|---|
| 9,707,855 B1* | 7/2017 | Wang | G01R 31/3648 |
| 11,476,676 B1* | 10/2022 | Lohe | B60L 58/21 |
| 2010/0066526 A1 | 3/2010 | Kascha | |
| 2011/0202215 A1 | 8/2011 | Falkenstein et al. | |
| 2013/0338872 A1 | 12/2013 | Niemann et al. | |
| 2014/0199569 A1 | 7/2014 | Sisk | |
| 2015/0151694 A1 | 6/2015 | Komhaas | |
| 2015/0231985 A1* | 8/2015 | Li | B60L 58/22 320/134 |
| 2015/0231986 A1* | 8/2015 | Li | B60L 58/13 903/903 |
| 2019/0034256 A1 | 1/2019 | Fox | |
| 2020/0156475 A1 | 5/2020 | Rahbari Asr et al. | |

FOREIGN PATENT DOCUMENTS

| | | | |
|---|---|---|---|
| DE | 102010062484 A1 | | 6/2012 |
| EP | 10201045514 | * | 9/2010 |
| EP | 3512061 A1 | | 7/2019 |
| JP | 2012050156 A | | 3/2012 |
| JP | 6344302 B2 | | 6/2018 |
| WO | 2010118039 A1 | | 10/2010 |

OTHER PUBLICATIONS

European Search Report dated Oct. 20, 2021 in corresponding European Patent Application No. 21170150.3, 8 pages.
European Communication dated Sep. 28, 2022 in corresponding European Patent Application No. 2216944.6, 9 pages.
European Communication dated Sep. 21, 2022 in corresponding European Patent Application No. 22169442.5, 26 pages.
Non Final Office Action dated Apr. 9, 2024 in corresponding U.S. Appl. No. 17/659,739, 41 pages.
Final Office Action dated Sep. 24, 2024 in corresponding U.S. Appl. No. 17/659,739, 33 pages.

* cited by examiner

METHOD FOR IMPROVING THE AVAILABILITY OF AN ENERGY STORAGE OR TRANSFORMATION SYSTEM OF A VEHICLE

TECHNICAL FIELD

The present invention relates to a method for improving the availability of an energy storage or transformation system of a vehicle, an energy storage or transformation management system, an energy storage or transformation system, and to a vehicle.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which e.g. the vehicle is propelled both by an internal combustion engine and an electric machine. In either way, an energy storage device is used to store the energy needed in order to propel the vehicle. For an electric machine, the energy storage devices may be batteries or supercapacitors, or, in case the vehicle is equipped with a fuel-cell system, the fuel cells being energy transformation devices, the energy storage devices are hydrogen containing storages. The energy storage device and the energy transformation devices may commonly be referred to as energy storage or transformation devices, and the system to which they belong may be referred to as an energy storage or transformation system.

Vehicles are thus in need of the energy storage or transformation system for providing propulsion power for traction. In certain situations, the propulsion power is particularly needed, e.g. when a vehicle is subject to a potentially hazardous situation, like passing a railway crossing, for which a sufficient propulsion power is required to get out of the hazardous situation. Thus, the readiness of propulsion power and the availability of the energy storage or transformation system are important to keep as high as possible. For internal combustion engine vehicles, a high availability of propulsion power is based on concepts where in case of e.g. a restart of an ECU, the ECU synchronizes itself to the still ongoing combustion process. Compared to internal combustion engine vehicles, electric vehicles are facing other challenges and uncertainties regarding e.g. electric range, drivability, power availability, and remaining-useful-life of vehicles mainly due to complex electrochemical, thermal, and ageing dynamics of the energy storage or transformation devices. Also safety hazards like short-circuit, explosion in case of vehicle crash, thermal runway, etc are important to supervise. Therefore, the energy storage or transformation system of an electric vehicle requires advanced monitoring, control, and fault diagnostics to manage all these robustness and safety issues. In spite of such advanced monitoring, a fault or error may lead to problematic problems of the energy storage or transformation system, such as e.g. an at least temporary lack of operability of the energy storage or transformation system. Thus, there is a drive in the industry for an improved availability of the energy storage and transformation system.

SUMMARY

It is an object of the present invention to at least partly alleviate the shortcomings discussed above in relation to known energy storage or transformation systems, and to improve the availability of the energy storage or transformation systems.

According to at least a first aspect of the present invention, a method for improving the availability of an energy storage or transformation, EST, system of a vehicle, the EST system comprising a plurality of EST devices, is provided. The method comprises:

providing an EST system model of coupled EST components of the EST system, identifying a fault or error in an EST condition parameter of the EST system, estimating an output value of the EST condition parameter based on the EST system model, identifying a vehicle situation which, in case of an at least temporary lack of operability of the EST system, belong to a predetermined group of vehicle situations defined as hazardous, and in response to identifying the vehicle situation belonging to the predetermined group of vehicle situations defined as hazardous, operating the EST system despite the fault or error in the EST condition parameter using the estimated output value of the EST condition parameter based on the EST system model.

Hereby, the EST system may be operated based on the estimated output value of the EST condition parameter even though a fault or error is present in the EST condition parameter. Thus, the availability of the EST system is improved. Moreover, hazardous vehicle situations which otherwise could be the result of the fault or error, can be avoided as the EST condition parameter being subject to the fault or error is overridden or replaced with the estimated output value of the EST condition parameter based on the EST system model. Stated differently, the EST system is kept in an operable condition despite the fault or error in the EST condition parameter. It should be understood that the abbreviation EST stands for energy storage or transformation, that the EST devices are energy storage or transformation devices such as batteries, fuel cells or supercapacitors. Thus the EST devices may be referred to as electric producing EST devices or electric power producing EST devices.

As will be described in further detail later, but which is briefly mentioned here, the EST condition parameter may be the condition of a component (i.e. a component condition parameter), a measured parameter from e.g. a sensor (which measure quantities like e.g. current, voltage, temperature, pressure, gassing, stress etc inside EST system), an actuation signal for an actuator, or a parameter of an internal state of the EST system, such as e.g. state of charge (SoC) or state of power (SoP) of a battery, a battery cell or a block of battery cells (such as a battery pack). Stated differently, the fault or error of the EST condition parameters may comprise both fault diagnostic of components (e.g. fault in a sensor) and diagnostics of measurement and calculation errors (e.g. erroneous calculations of an internal state of the EST system). Thus, the fault or error may origin from the condition of a component, a measured parameter from e.g. a sensor, an actuation signal from an actuator (e.g. a contactor or a relay) or a parameter of an internal state of the EST system. The EST condition parameter may be described as being at least partly included in the characterization of the condition of the EST system. The EST condition parameter may simply be referred to as a condition parameter.

According to at least one example embodiment, the EST system is an energy storage system, such as e.g. a battery system comprising a plurality of EST devices in the form of battery packs or batteries. According to at least one example embodiment, the EST system is an energy transformation system, such as e.g. a fuel cell system comprising a plurality of EST devices in the form of fuel cells.

According to at least one example embodiment, the EST system model is based on an electro-thermal and/or electro-chemical model of the coupled EST components of the EST system. For example, coupled EST components are EST components for which the condition or state of a first EST component can be determined based on the condition or state of a second EST component being coupled to the first EST component. Stated differently, the EST components are at least partly linked to each other, or are dependent on each other. Thus, the EST system model may comprise a relation of how changes in the condition or state of one EST component affects the condition or state of other coupled EST components. Hereby, in case the first EST component is subject to a fault or error in which the condition or state is not available (i.e. a fault or error in the EST condition parameter of the first EST component), the second EST component can be used to estimate the condition or state (i.e. estimating the output value of the EST condition parameter) of the first EST component. The EST components are thus the components of the EST system, as e.g. the EST devices. For example, the temperature of a first battery cell can be determined based on the temperature of the neighboring battery cells. In more detail, for a battery system, the EST system model may comprise an electro-thermal model of all the battery cells and associated sensors together with statistical data (for example stochastic properties of sensor measurement errors to determine expected measurement value and its variance). Thus, the output value of a sensor of a battery cell being subject to an error or fault may be estimated with the output value of other sensors, e.g. neighboring sensors, of the other battery cells. According to at least one example embodiment, the EST system model is a multi-level model comprising a plurality of EST models for different sub-groups of coupled EST components. For example, in case the EST system is a battery system, a first EST model is based on coupled battery cells to simulate battery cell dynamics, a second EST model is based on sensors to simulate sensor behaviour under given operating conditions, and a third EST model is based on actuators to simulate actuator dynamics under given operating conditions.

The method may comprise the step of:
determining whether or not a first criteria, or a first criterium, of the vehicle is achieved. The first criteria or first criterium may be one or several of the criteria described in further detail later. Thus, the first criteria may comprise a combination of several criteria of which all need to be achieved in order to operate the EST system despite the fault or error in the EST condition parameter of the EST system. The first criteria may be referred to as a safety criteria, or a safety criterium.

According to at least one example embodiment, the identified fault or error in the EST condition parameter results in an at least temporary lack of operability if the identified vehicle situation does not belong to the predetermined group of vehicle situations defined as hazardous.

Thus, the step of operating the EST system despite the fault or error in the EST condition parameter by using the estimated output value of the EST condition parameter based on the EST system model, may be performed in response to that the fault or error in the EST condition parameter is of such a degree that the same fault or error would result in an at least temporary lack of operability if the identified vehicle situation does not belong to the predetermined group of vehicle situations defined as hazardous. Such fault or error in the EST condition parameter may be referred to as being expressive of an at least temporary lack of operability of the EST system. That is, the fault or error would lead to a temporary lack of operability of the EST system, such as e.g. an at least temporary power loss, if not the estimated output value of the EST condition parameter based on the EST system model would be used instead of the EST condition parameter. Hereby, an at least temporary lack of operability of the EST system, potentially leading to a vehicle situation defined as hazardous which otherwise could be the result of the fault or error can be avoided, as the EST condition parameter being subject to the fault or error is overridden or replaced with the estimated output value of the EST condition parameter based on the EST system model.

Thus, and according to at least one example embodiment, the first criteria or first criterium may comprise a fault or error in the EST condition parameter expressive of an at least temporary lack of operability of the EST system.

According to at least one example embodiment, in which the EST system is a battery system, the first criteria or first criterium comprises a fault or error in the EST condition parameter expressive of an at least temporary lack of power of the battery system. That is, the fault or error of the EST condition parameter is a fault or error which would otherwise cause a lack of power of the battery system (e.g. a fault which would cause the battery system to at least temporarily shut down). For embodiments in which the EST system is a battery system, the temporary lack of operability may be a temporary lack of power.

According to at least one example embodiment, the first criteria or first criterium comprises determining that the EST system can be operated in a safe and robust manner despite the fault or error in the EST condition parameter. Thus, despite the fault or error of the EST condition parameter, the first criteria or first criterium may provide a safeguard that the EST system may be operated based on the estimated output value of the EST condition parameter based on the EST system model in a safe and robust manner.

According to at least one example embodiment, the method further comprises:
identifying a vehicle condition which, in case of an at least temporary lack of operability of the EST system, results in a potentially harmful situation, and wherein the first criteria or first criterium comprises such potentially harmful situation.

Such vehicle condition may e.g. be comprised in the vehicle situations defined as hazardous.

According to at least one example embodiment, the predetermined group of vehicle situations defined as hazardous comprises vehicle situations potentially resulting in personal injuries.

For example, the potentially harmful situation previously mentioned may be defined as resulting in personal injuries, or potentially resulting in personal injuries. According to at least one example embodiment, the predetermined group of vehicle situations defined as hazardous comprises vehicle situations resulting in personal injuries. That is, the fault or error, and the occurrence of a vehicle situation which, in case of an at least temporary lack of operability of the EST system, is hazardous, would lead to a potentially harmful situation, e.g. a hazardous or dangerous vehicle condition, if not the estimated output value of the EST condition parameter based on the EST system model would be used instead of the EST condition parameter. Hereby the potentially harmful situations can be avoided, as the EST condition parameter being subject to the fault or error is overridden or replaced with the estimated output value of the EST condition parameter based on the EST system model. Thus, based on identifying a vehicle situation which, in case of an at least temporary lack of operability of the EST system, belong to a predetermined group of vehicle situations defined as hazardous, typically leading to such potentially harmful situation, the method comprises operating the EST system despite the fault or error in the EST condition parameter. For example, in case the vehicle is positioned at a railway crossing in risk of being hit by the train, the vehicle situation is identified as, in case of an at least temporary lack of operability of the EST system (e.g. as the previously exemplified lack of power for the battery system), hazardous (e.g. leading to a potentially harmful situation). Thus, with regards to embodiments utilizing the first criteria, or first criterium, if the first criteria or first criterium is achieved, i.e. that the vehicle situation is identified as, in case of an at least temporary lack of operability of the EST system, belonging to the predetermined group of vehicle situations defined as hazardous, and e.g. leading to a potentially harmful situation in case of an at least temporary lack of operability of the EST system, the EST system may be operated despite the fault or error in the EST condition parameter by using the estimated output value of the EST condition parameter based on the EST system model. Hereby, the vehicle can at least pass the railway crossing in a safe manner. After passing the railway crossing, the vehicle situation may no longer be identified as belonging to the predetermined group of vehicle situations defined as hazardous (i.e. not leading to a potentially harmful situation), and the first criteria, or first criterium, may no longer be achieved. Obviously, other examples of vehicle situations than the previously described railway crossing may be included in the predetermined group of vehicle situations defined as hazardous, such as e.g. passing an intersection, or driving at an interchange.

The predetermined group of vehicle situations defined as hazardous may comprise, or may be defined by, ISO 26262 (titled "Road vehicles—Functional safety"). For example, the predetermined group of vehicle situations defined as hazardous may be determined by the Hazard Analysis and Risk Assessment, HARA, according to ISO 26262. Typically, the HARA includes the ASIL Assessment Process, and the Severity classifications (S0-S3). Moreover, the HARA may include the Exposure Classifications (E0-E4) and/or Controllability classifications (C0-C3). For example, the vehicle situation may be considered hazardous by the Severity classification of at least S1, or at least S2 (or S3).

Thus, with regards to embodiments utilizing the first criteria, or first criterium, the first criteria or first criterium may be based on vehicle functional safety or safety-critical functionality, such as e.g. the previously mentioned ISO 26262 and HARA. That is, the first criteria or first criterium may comprise vehicle functional safety or safety-critical functionality, and the EST system may be operated despite the fault or error in the EST condition parameter in order to ensure vehicle functional safety or safety-critical functionality.

According to at least one example embodiment, the method comprises, in response of identifying a vehicle situation which, in case of an at least temporary lack of operability of the EST system, does not belong to the predetermined group of vehicle situations defined as hazardous, enabling or allowing the EST system to at least temporary lack operability, e.g. to be at least temporarily shut down, in response to the fault or error in the EST condition parameter. With regards to embodiments utilizing the first criteria, or first criterium, in response of not achieving the first criteria, the method may comprise the step of enabling or allowing the EST system to at least temporary lack operability, e.g. to be at least temporarily shut down, in response to the fault or error in the EST condition parameter. That is, if not the first criteria or first criterium is achieved, and the fault or error is expressive of an at least temporary lack of operability of the EST system (i.e. would lead to a temporary lack of operability if no preventive action is carried out), the EST system may act in response to such fault or error and enable the EST system to at least temporarily shut down.

According to at least one example embodiment, the vehicle situation (or vehicle condition), in case of at least temporary lack of operability of the EST system, is defined as a hazardous or leading to a potentially harmful situation if the expected result of the at least temporary lack of operability of the EST system is more hazardous than that of the fault or error of the EST condition parameter.

According to at least one example embodiment, the identified vehicle situation belonging to the predetermined group of vehicle situations defined as hazardous has a predetermined vehicle risk level, and the identified fault or error in the EST condition parameter of the EST system has a predetermined EST system risk level, wherein the step of operating the EST system despite the fault or error in the EST condition parameter by using the estimated output value of the EST condition parameter based on the EST system model is performed in response to that the risk level of the identified vehicle situation is higher than the risk level of the EST system.

The predetermined risk level may be determined in accordance with the previously described ISO 26262. Typically, the risk level is based on the ASIL Assessment Process, and the Severity classifications (S0-S3) and possibly the Exposure Classifications (E0-E4) and/or Controllability classifications (C0-C3).

With regards to embodiments utilizing the first criteria, or first criterium, the fault or error of the EST condition parameter may be rationalized with regards to the first criteria or first criterium. Stated differently, the fault or error of the EST condition parameter may be rationalized with regards to the hazardous vehicle situations, as potentially harmful situations may also be a result of the fault or error of the EST condition parameter. In other words, the first criteria or first criterium may consider such hazardous vehicle situation to infer about severity of the fault or error. Such faults or errors may be referred to as non-critical faults or errors, or less severe faults or errors. Thus, the availability of EST system may be improved and hazardous vehicle situations, e.g. dangerous vehicle conditions such as hazardous driving situations, under non-critical or less severe faults or errors, can be avoided. For example, in case the EST system is a battery system, the battery cells may be instructed to keep supplying power to vehicle despite the fault or error of the EST condition parameter. According to another example, in case diagnostics of certain electronic components fail resulting in the fault or error of the EST condition parameter, then the EST system should not be shut down as the rationalization is used to determine if it is safe, or at least safer, to operate the EST system, at least until the vehicle situation is no longer identified as belonging to the predetermined group of vehicle situations defined as hazardous.

The vehicle situation may be defined differently to a vehicle condition. The vehicle condition typically comprises a vehicle state and/or the vehicle situation (or vehicle driving situation). Thus, a potentially harmful situation may be the result of a dangerous state of the vehicle, e.g. thermal runway, or may be the result of a dangerous driving situation, e.g. a railroad crossing. The predetermined group of vehicle situations defined as hazardous may e.g. only include the latter.

According to at least one example embodiment, the EST condition parameter is a measured parameter of a first sensor, wherein identifying a fault or error in an EST condition parameter comprises identifying a fault or error in the in the measured parameter, and estimating the output value of the EST condition parameter comprises estimating an output value of the first sensor.

Hereby, the EST system may be operated based on the estimated output value of the first sensor even though a fault or error is present in the measured parameter. The fault or error may e.g. be in the first sensor. Thus, the availability of the EST system may be improved. That is, in case of a sensor related failure resulting in a fault or error in the measured parameter, data from the EST system model is used to estimate the output value of the sensor.

According to at least one example embodiment, the step of estimating the output value of the first sensor based on the EST system model comprises extrapolating or inferring the output value based on sensory measurement data of a neighbouring sensor to the first sensor, and/or sensory measurement data of a neighbouring coupled EST component to the coupled EST component associated with the first sensor.

Hereby, the coherence of the EST condition parameter of the first sensor, i.e. the sensory measurement data of the first sensor, and the estimated output value of the first sensor, is improved. A neighbouring sensor may e.g. be defined as a sensor which is at least physically coupled with the associated EST component whose sensor failed (i.e. referred to as the first sensor). For example, data of the neighbouring sensors are used to estimate the output value of the first sensor. For example, in case the EST system is a battery system, and the temperature or voltage of two coupled battery cells are measured by individual sensors, if one of the sensors (being associated with the first battery cell) fails, then the temperature or voltage of such battery cell can be based on the other sensor (being associated with the second battery cell). For example, the battery cells are neighbouring battery cells.

According to at least one example embodiment, the EST system comprises a plurality of sensors configured to measure at least one quantity and to provide the sensory measurement data, the first sensor being comprised in the plurality of sensors, and wherein each coupled EST component is associated with at least one sensor of the plurality of sensors.

For example, in case the EST system is a battery system, the EST system comprises coupled battery components and a plurality of sensors configured to measure at least one quantity indicating the state or condition of the coupled battery components. For example, each coupled battery component is associated with a corresponding sensor, which sensor is configured to measure at least one quantity of the battery component.

With regards to embodiments utilizing the first criteria, or first criterium, and according to at least one example embodiment, the method further comprises
identifying a fault or error in a second sensor of the EST system,
estimating an output value of the second sensor based on the EST system model, wherein the first criteria comprises a combination of faults or errors of the first and second sensors which are expressive of an at least temporary lack of operability of the EST system (e.g. lack of power in case the EST system is a battery system).

Thus, a combined fault or error may be handled by the method of the invention.

According to at least one example embodiment, the EST condition parameter is an estimated parameter of an internal state of the EST system, wherein identifying a fault or error in an EST condition parameter comprises identifying a fault or error in the internal state, and estimating an output value of the EST condition parameter comprises estimating an output value of first internal state.

According to at least one example embodiment, the internal state of the EST system is at least one of the following, State-of-Charge (SoC), State-of-Power (SoP) and State-of-Energy (SoE).

Hereby, the EST system may be operated based on the estimated output value of the internal state even though a fault or error is existing in the internal state (or rather, the calculated parameter of the internal state). Thus, the availability of the EST system may be improved. That is, in case of a failure of a control unit, or data transfer means, related to the calculated parameter of the internal state, a resulting fault or error in the calculated parameter of the internal state may be the outcome. Thus, data from the EST system model may be used to estimate the output value of the internal state. The internal state may be referred to as a first internal state, and may e.g. be State-of-Charge (SoC), State-of-Power (SoP) and State-of-Energy (SoE) of a battery or battery cell or a battery pack. The first internal state may be for the complete EST system, or an internal state of an EST component or EST device.

With regards to embodiments utilizing the first criteria, or first criterium, and according to at least one example embodiment, the first criteria or first criterium comprises determining that an indicative parameter for the internal state indicates that there is no fault or error in the calculated parameter for the internal state. Hereby, it is more likely that the fault or error originates from the calculation, or control unit performing the estimation or calculation, than an actual underlying fault or error of the internal state. For example, if a SoP-calculations for a battery or battery cell is indicated as very low then an indicated parameter, such as one or more of the parameters temperature, current, and voltage can be used to verify if such low SoP is actually the case, or if it is more likely that the fault or error originates from the calculation, or control unit performing the calculation.

According to at least one example embodiment, the fault or error in the parameter of the internal state is determined by comparing the internal state with a threshold value.

Hereby, a simple yet effective means for determining a fault or error in the parameter of the internal state is provided. Hereby, the faults or errors may be classified in terms of their significance. If the fault or error is within a certain limit, e.g. below the threshold value, it is classified as normal function behaviour, and no further concern is given to the fault or error (i.e. the fault or error is considered in void). On the other hand, if the fault or error is outside of said limit, e.g. above the threshold value, it is classified as an actual fault or error, and dealt with as previously described.

According to at least one example embodiment, the fault or error may be subject to a residual analysis. That is, analysing the statistical or stochastic properties of estimation error and subsequently comparing it with the expected probability distribution of such faults or error under given operating conditions. If the error or fault lies outside the boundaries of an expected probability distribution, it can be treated as an outlier. To ensure availability of safety-critical functionality and robustness under potentially harmful situations (e.g. in a vehicle situation belonging to the group of predefined vehicle situations defined as hazardous), the method may detect such large errors (i.e. outliers) and isolate them using stochastic thresholds.

According to at least one example embodiment, the characteristics of each coupled EST component is indicative by sensory measurement data, wherein the EST system model is based at least on such sensory measurement data.

Thus, the characteristics of the coupled EST components can be implemented into the EST system model in a simple yet effective manner. In other words, the EST system model may use sensory measurement data as input data (i.e. input data from the sensors as previously described). Thus, the EST system model may be based on sensory measurement data, also provided by the first sensor (up until the first sensor is subject to a fault or error). According to at least one alternative embodiment, the EST system model is not based on measurement data from the first sensor, at least not subsequent to a fault or error of the first sensor. According to at least one example embodiment, the measurement data of the first sensor (when no error or fault is present) and the estimated output value of the first sensor by the EST system module are compared and any difference (referred to as measurement residual) may be used to infer about the health condition of the first sensor.

According to at least one example embodiment, internal states of the EST system are determined based on the sensory measurement data, wherein the EST system model comprises the internal states of the EST system.

Thus, the internal states, such as e.g. SoC or SoP or SoE, of the EST system can be implemented into the EST system model in a simple yet effective manner. For example, the first internal state previously described may be comprised in, and thus constitutes one of, the internal states of the EST system. SoC, SoP and SoE are generally known to the skilled person. For example SoP of a battery system may be determined using a single battery model for each battery pack "i", as described in patent application PCT/EP2020/066919.

According to a second aspect of the present invention, an EST management system comprising an electronic control unit being configured to perform the method according to the first aspect of the invention is provided. The EST management system may e.g. be a battery management system.

According to a third aspect of the present invention, a computer program is provided. The computer program comprises program code means for performing the method of the first aspect of the invention, when the program is run on a computer.

Such computer program may e.g. be implemented in an electronic control unit, ECU, of the vehicle.

According to a fourth aspect of the present invention, a computer readable medium carrying a computer program comprising program code means for performing the method of the first aspect of the invention, when the computer program is run on a computer, is provided.

According to a fifth aspect of the present invention, an EST system of a vehicle comprising the EST management system according to the second aspect of the present invention is provided. Alternatively, the EST system of the vehicle may comprise the computer program according to the third aspect, or the computer readable medium according to the fourth aspect.

According to a sixth aspect of the present invention, a vehicle comprising an EST system according to the fifth aspect of the present invention is provided. The vehicle is e.g. an electric vehicle powered by electricity from energy storage or transformation devices, such as batteries or fuel cells.

According to a seventh aspect of the present invention, a method for improving the availability of an energy storage or transformation, EST, system of a vehicle, the EST system comprising a plurality of EST devices, is provided. The method comprises:

providing an EST system model of coupled EST components of the EST system, identifying a fault or error in a condition parameter of the EST system, estimating an output value of the condition parameter based on the EST system model, determining whether or not a first criteria of the vehicle is achieved, in response of achieving the first criteria, operating the EST system despite the fault or error in the condition parameter by using the estimated output value of the EST system model.

In particular, the first criteria, or first criterium, have/has been described in the earlier aspects of the invention.

Effects and features of the second to sevenths aspects of the invention are largely analogous to those described above in connection with the first aspect of the invention. Embodiments mentioned in relation to the first aspect of the invention are largely compatible with the second to sixth aspects of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
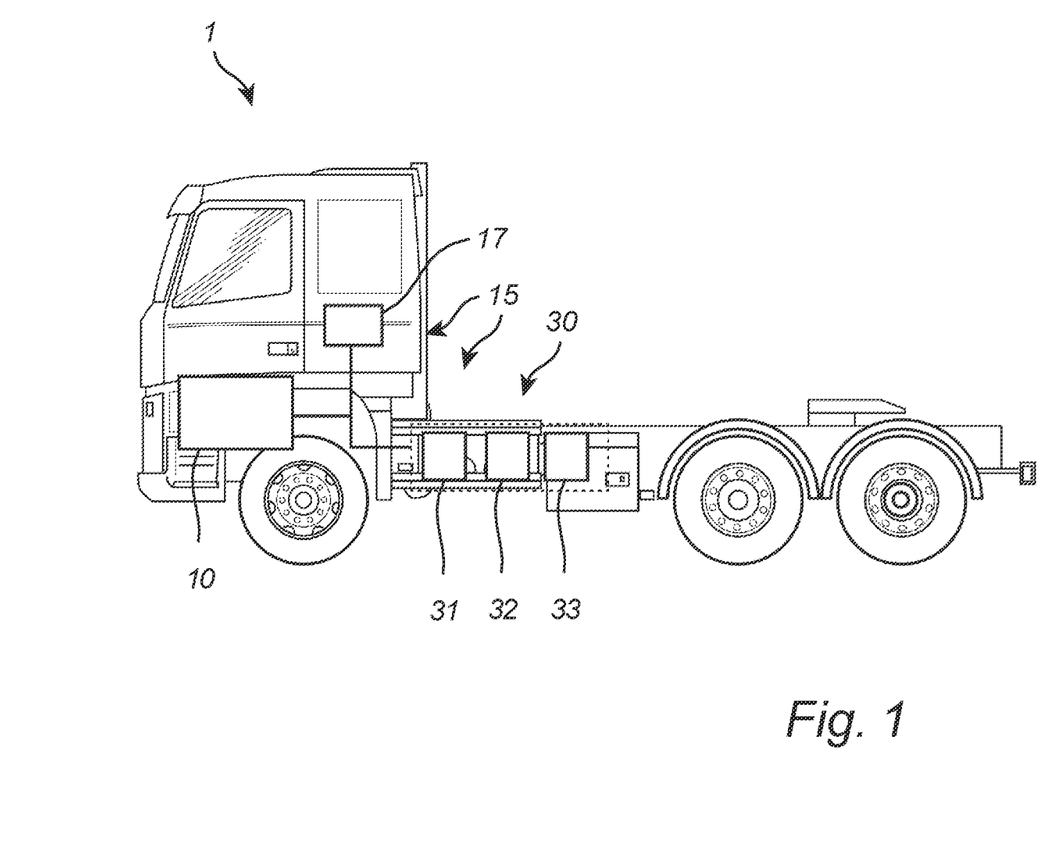
FIG. 1 is a side schematic view of a vehicle in accordance with an example embodiment of the invention.

With reference to FIG. 1, a vehicle 1, here embodied as a heavy duty truck 1, is disclosed for which a method, an energy storage or transformation (EST) system 30, and/or an EST management system 15 of a kind disclosed in the present invention is advantageous. However, the method, the EST system 30 or EST management system 15 may as well be implemented in other types of vehicles or vessels, such as in busses, light-weight trucks, passenger cars, marine applications etc. The vehicle 1 is an electric vehicle, such as a full electric vehicle or a hybrid, comprising at least one electric machine 10 powered by the EST system 30, wherein in the example of FIG. 1, the EST system 30 comprises three EST devices 31, 32, 33, being e.g. batteries, supercapacitors or fuel cells. In the following, it is assumed that the EST system 30 is a battery system 30 and that the EST devices 31, 32, 33 are battery packs 31, 32, 33. The EST management system 15 is thus a battery management system 15 configured to manage the battery system 30 and e.g. connected and disconnect the battery packs 31, 32, 33 relative the electric machine 10. Moreover, the battery management system 15 comprises a control unit 17 arranged and configured for controlling the operation of the battery system 30. The vehicle 1 typically further comprises other parts of the powertrain such as transmission, drive shafts and wheels (not shown in detail). Each battery pack 31, 32, 33 typically comprises a plurality of series connected battery cells, or series connected battery cell blocks.

Figure 2:
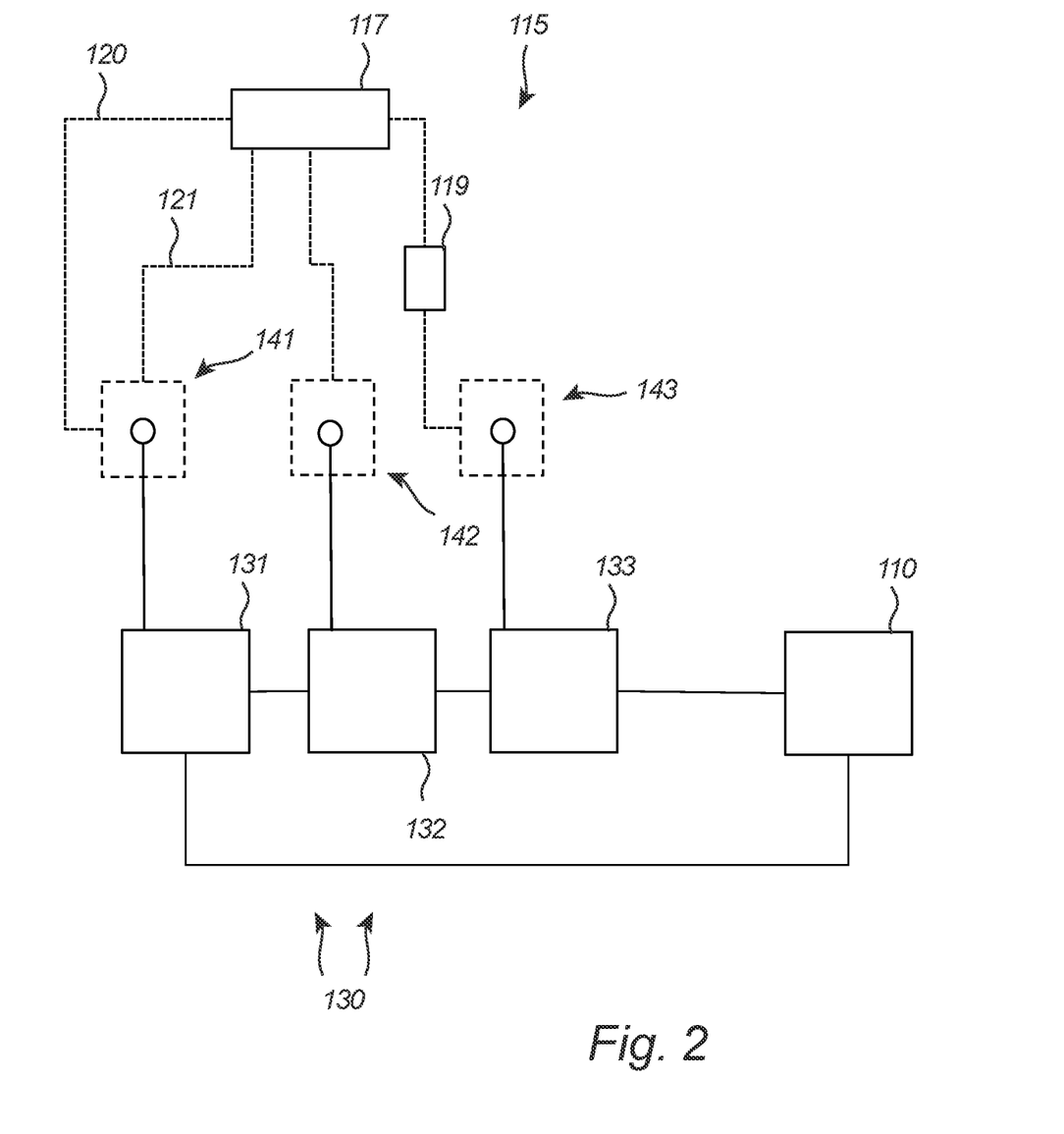
FIG. 2 is a schematic view of an energy storage or transformation system in the form of a battery system in accordance with an example embodiment of the invention.

FIG. 2 is a schematic view of a battery system 130 comprising a plurality of EST components and a battery management system 115. The EST components are e.g. parts of at least one EST device in the form of a battery, as series connected battery cell blocks 131, 132, 133 arranged for powering a load 110. The load 110 may be powered by the first, second and third battery cell blocks 131, 132, 133 by means of at least one contactor (not shown), i.e. by connecting the first, second and third battery cell blocks 131, 132, 133 to the load 110. Correspondingly, the first, second and third battery cell blocks 131, 132, 133 may be disconnected from the load 110 by means of the contactor. The embodiment shown in FIG. 2 may for example be implemented in the vehicle 1 of FIG. 1. Thus, the load 110 in FIG. 2 may be an electric machine.

The battery system 130 comprises a first battery cell block 131, a second battery cell block 132 and a third battery cell block 133, but it should be noted that any number of battery cell blocks may be included in the battery system 130. Moreover, more batteries and battery packs comprising a plurality of series connected battery cells, or battery cell blocks, may be included in the battery system 130. The battery management system 115 comprises a first sensor 141 configured to measure at least one quantity of the first battery cell block 131, such as e.g. temperature, current and/or voltage, and comprises a second sensor 142 configured to measure at least one quantity of the second battery cell block 132, such as e.g. temperature, current and/or voltage, and comprising a third sensor 143 configured to measure at least one quantity of the third battery cell block 133, such as e.g. temperature, current and/or voltage. Thus, an associated sensor, here being the first, second and third sensors 141, 142, 143 exist for each battery cell block, here being the corresponding first, second and third battery cell blocks 131, 132, 133. Each one of the first, second and third sensors 141, 142, 143 is configured to provide EST condition data comprising at least an EST condition parameter, here in the form of measured data (sensory measurement data) or a measured parameter (i.e. of the at least one quantity), commonly referred to as an EST condition parameter hereafter.

The control unit 117, being e.g. an electronic control unit, of the EST management system 115 is configured to receive the EST condition parameters from the first, second and third sensors 141, 142, 143. The EST management system 115 is configured to transfer the EST condition parameter from each one of the first, second and third sensors 141, 142, 143. For example, as can be seen in FIG. 2, the EST management system 115 is configured to transfer the EST condition parameter from the first sensor 141 to the control unit 117 via a first data transfer means 120, being e.g. a first communication bus 120, extending from the first sensor 141 to the control unit 117, and a second data transfer means 121, being e.g. a second communication bus 121, extending from the first sensor 141 to the control unit 117 in parallel to the first data transfer means 120. Thus, the EST condition parameter may be transferred from the first sensor 141 to the control unit 117 by means of a first transfer mode, i.e. the first data transfer means 120, and by means of a second data transfer mode, i.e. the second data transfer means 121. In other words, the EST management system 115 comprises a first communication bus 120 for transferring the EST condition parameter from the first sensor 141 by means of the first data transfer mode, and a second communication bus 121 for transferring the EST condition parameter from the first sensor 141 by means of the second data transfer mode, the second communication bus 121 being different to the first communication bus 120. The EST management system 115 is further configured to transfer the EST condition parameter from the second sensor 142 to the control unit 117, and is configured to transfer the EST condition parameter from the third sensor 143 to the control unit 117.

The first, second and third battery cell blocks 131, 132, 133 are coupled EST components for which the condition or state of one of the battery cell blocks 131, 132, 133 can be determined based on the condition or state of another one of the battery cell blocks 131, 132, 133. Stated differently, the first, second and third battery cell blocks 131, 132, 133 are at least partly linked to each other, or are dependent on each other, such that changes in the condition or state of one of the battery cell blocks 131, 132, 133 affects the condition or state of other battery cell blocks 131, 132, 133.

The control unit 117 in FIG. 2 is configured to provide an EST system model, here being a battery system model, of the coupled EST components being at least the first, second and third battery cell blocks 131, 132, 133. The EST system model is typically a mathematical model based on an electro-thermal and/or electrochemical relation of the coupled EST components of the EST system. In more detail, the EST system model may comprise an electro-thermal model of all the battery cells, or battery cell blocks, and associated sensors possibly together with statistical data (for example stochastic properties of sensor measurement errors to determine expected measurement value and its variance). Thus, the EST system model may typically comprise a relation of how changes in the condition or state of one EST component, e.g. the second battery cell block 132, affects the condition or state of other coupled EST components, e.g. the first and third battery cell blocks 131, 133. Hereby, the control unit 117 may, based on the EST system model, estimate the condition or state of the EST components comprised in the model. This is typically embodied as an estimated output value of the EST condition parameter of the applicable EST component, as e.g. the output value of the first, second and third sensors 141, 142, 143 for representing the condition or state of the first, second and third battery cell blocks, 131, 132, 133 respectively.

Moreover, the control unit 117 is configured to identify a fault or error in an EST condition parameter of the battery system 130, such as e.g. the EST condition parameter from the first, second or third sensors 141, 142, 143. The fault or error of the EST condition parameters may comprise both fault diagnostic of components (e.g. fault in a sensor, or fault in the measurement data or measurement parameter from the sensor) and diagnostics of measurement and estimation or calculation errors (e.g. erroneous calculation of an internal state of the EST system, further described below). The fault or error may according to at least one example embodiment be lack of status of the condition or state of an EST component, such as e.g. lack of data, or lack of a provided EST condition parameter from the EST component. For example, the fault or error may be a null value as output from the first, second or third sensor 141, 142, 143.

The control unit 117 is further configured to identify a vehicle situation which, in case of an at least temporary lack of operability of the EST system, belong to a predetermined group of vehicle situations defined as hazardous. The control unit 117 may e.g. have access to such vehicle situations by means of a look-up table. Moreover, the identification of such vehicle situation may be carried out utilizing preview information of the vehicle, such as predicted vehicle situations based on e.g. map data.

The control unit 117 is further configured to in response to identifying the vehicle situation belonging to the predetermined group of vehicle situations defined as hazardous, operating the EST system despite the fault or error in the EST condition parameter using the estimated output value of the EST condition parameter based on the EST system model.

The control unit 117 may according to at least one example embodiment, be further configured to determine whether or not a first criteria, or first criterium, of the vehicle is achieved, and in response of achieving the first criteria or first criterium, operate the EST system 130 despite the fault or error in the EST condition parameter by using the estimated output value of the EST condition parameter of the EST system model as previously described. The first criteria or first criterium may be one or several of the criteria mentioned in this application text. Thus, the first criteria may comprise a combination of several criteria of which all need to be achieved in order to operate the EST system 130 despite the fault or error in the EST condition parameter or EST condition data. According to at least one example embodiment, the first criteria or first criterium comprises a fault or error in the EST condition parameter expressive of an at least temporary lack of operability of the EST system 130. Thus, by operating the EST system 130 despite the fault or error in the EST condition parameter by using the estimated output value of the EST condition parameter of the EST system model, the temporary lack of operability of the EST system 130 can be avoided, and the availability of the EST system 130 improved.

In case for example the second battery cell block 132 component is subject to a fault or error in which the condition or state is erroneous or not available, e.g. by providing an erroneous or null value of the second sensor 142 (i.e. representing a fault or error in the EST condition parameter of the first EST component), the condition or state of the first and/or third battery cell blocks 131, 133 may be used to estimate the output value of the EST condition parameter of the second battery cell block 132 by means of the EST system model. Thus, the values of the first and/or third sensors 141, 143 may be used to estimate the output value of the second sensor 142. For example, the values of the first and/or third sensors 141, 143 are extrapolated or used for inferring the output value of the second sensor 142. Stated differently, as the first and third battery cell blocks 131, 133 are neighbouring EST components to the second battery cell block 132, the sensory measurement data of at least one neighbouring sensor to the second sensor 142 is used to estimate the output value of the condition data from the second battery cell block 132. For example, the temperature of the second battery cell block 132 can be determined based on the temperature of the neighboring battery cell blocks 131, 133.

As shown in FIG. 2, the third sensor 143 may be connected to an internal state decision unit 119 configured to provide an estimation or calculation of a first internal state of the third battery cell block 133. The first internal state may e.g. be at least one of the following, State-of-Charge, State-of-Power and State-of-Energy of the third battery cell block 133. Thus, the EST condition parameter from the third battery cell block 133 may be a calculated parameter of the first internal state, and the control unit 117 may be configured to identify a fault or error in the parameter of the first internal state, and thus estimate an output value of the first internal state of the third battery cell block 131 using the EST system model. Hereby, the EST system 130 or battery system 130 may be operated based on the estimated output value of the first internal state even though a fault or error is existing in the first internal state (or the calculated parameter thereof). Thus, the availability of the EST system 130 may be improved. That is, in case of a failure of the internal state decision until 119, or third sensor 143, or any data transfer means of EST condition parameters thereof, a resulting fault or error in the calculated parameter of the first internal state may be the outcome, and data from the EST system model may be used to estimate the output value of the first internal state. The internal state decision unit 119 may form an integrated part of function of the control unit 117.

A method for improving the availability of an EST system of a vehicle, such as e.g. the EST system in the form of a battery system 15, 115 of FIGS. 1-2 will now be described. The EST system comprises a plurality of EST devices, such as e.g. the fuel cells or battery packs 31, 32, 33 of FIG. 1.

Figure 3:
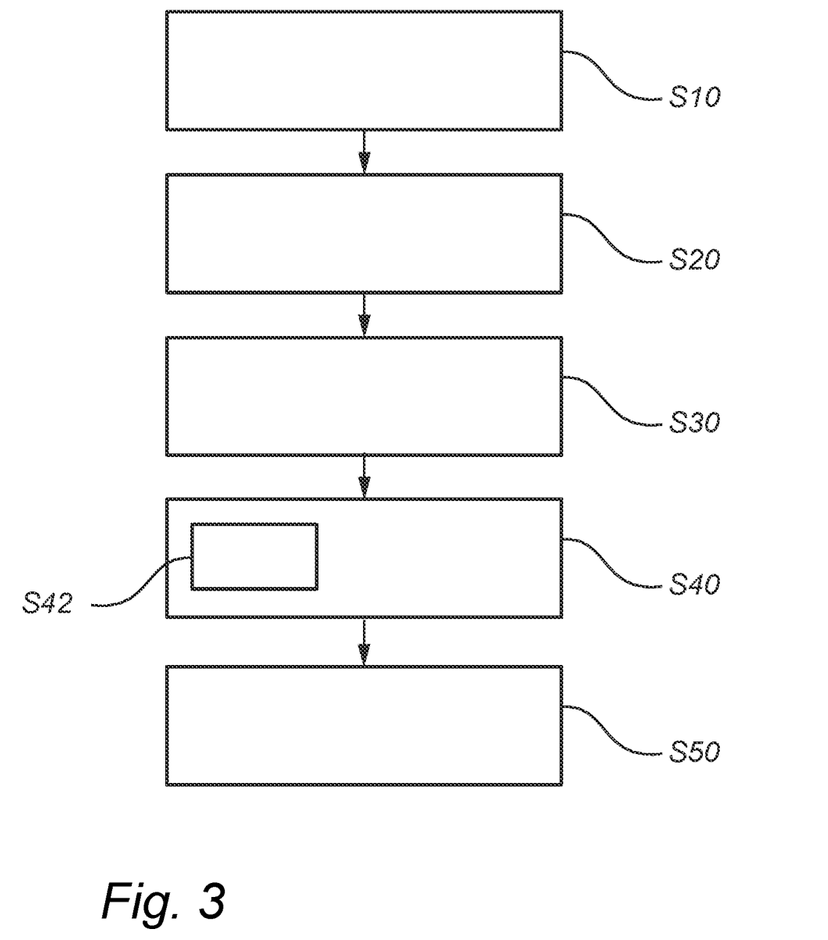
FIG. 3 is a flowchart illustrating the steps of a method in accordance with example embodiments of the invention.

In a first step S10, an EST system model of coupled EST components of the EST system is provided. For example, the EST system model is a model of the battery system 130 of FIG. 2 comprising at least the first, second and third battery cell blocks 131, 132, 133. Thus, the EST system may comprise a plurality of sensors configured to measure at least one quantity and provide sensory measurement data, wherein each coupled EST component (e.g. the first, second and third battery cell blocks 131, 132, 133) is associated with at least one sensor. Thus, the characteristics of each coupled EST component may be indicative by sensory measurement data, and the EST system model may be based at least on such sensory measurement data.

In a second step S20, a fault or error in an EST condition parameter of the EST system is identified. The fault or error is typically identified in measurement data from a sensor, or in a calculated parameter of an internal state of an EST component, such as e.g. an internal state of an EST device or a part of an EST device. That is, the EST condition parameter may be a measured parameter of a first sensor, wherein identifying a fault or error in the EST condition parameter comprises identifying a fault or error in the first sensor or the data transfer thereof, or the EST condition parameter may be a calculated parameter of a first internal state of the EST system, such as e.g. an internal state of an EST device, wherein identifying a fault or error in the EST condition parameter comprises identifying a fault or error in the calculated internal state or the data transfer thereof. Thus, the fault or error may according to at least one example embodiment origin from the data transfer of the EST condition parameter. The second step S20 may comprise determining that the fault or error in the calculated internal state by comparing the calculated internal state with a threshold value. Moreover, the internal states of the EST system may be determined based on the sensory measurement data, and the EST system model provided in the first step S10 may comprise, or be at least partly based on, the internal states of the EST system.

In a third step S30, an output value of the EST condition parameter is estimated based on the EST system model. As described with reference to FIG. 2, the estimation of the output value of an EST condition parameter being subject to a fault or error may be based on the values of neighbouring EST components to the EST component being associated with the fault or error of the EST condition parameter. For example, the output value of the first sensor based on the EST system model may comprises extrapolating or inferring the output value based on sensory measurement data of a neighbouring sensor to the first sensor, and/or sensory measurement data of a neighbouring coupled EST component to the coupled EST component associated with the first sensor.

In a fourth step S40, a vehicle situation which, in case of an at least temporary lack of operability of the EST system, is identified as belonging to a predetermined group of vehicle situations defined as hazardous. The predetermined group of vehicle situations defined as hazardous may e.g. comprise vehicle situations potentially resulting in personal injuries, as previously described. The identification of such vehicle situation may be carried out utilizing preview information of the vehicle. The preview information may thus be used to predict an upcoming vehicle situation. The preview information may e.g. include map data, and e.g. comprise predicted road conditions and predicted road events. According to at least one example embodiment, the preview information comprises road topography and/or current traffic conditions. The preview information may comprise predicted road events such as current traffic conditions (e.g. expected traffic jams) and upcoming crossings, train crossings, parking lots, traffic lights or the like. It should be noted that the preview information is related to a future, expected or predicted situation of the vehicle, typically associated with an associated operation of the vehicle. The preview information is expected to occur in the near future, e.g. in 1 s to 15 min, or in 10 s to 15 min, or in 1 min to 15 min. The fourth step S40 may comprise the sub-step S42 of determining whether or not a first criteria or first criterium of the vehicle is achieved.

In a fifth step S50, in response to identifying the vehicle situation belonging to the predetermined group of vehicle situations defined as hazardous the EST system is operated despite the fault or error in the EST condition parameter by using the estimated output value of the EST condition parameter based on the EST system model. With regards to embodiments utilizing the first criteria, or first criterium, the first criteria or first criterium may typically comprise a fault or error in the EST condition parameter expressive of an at least temporary lack of operability of the EST system. That is, the first criteria or first criterium is achieved if the fault or error in the EST condition parameter is expressive of an at least temporary lack of operability of the EST system. Such fault or error would lead to an at least temporary lack of operability of the EST system if not the EST system, despite the fault or error in the EST condition parameter, would be operated using the estimated output value of the EST condition parameter based on the EST system model. The first criteria or first criterium may e.g. be achieved if at least the fault or error in the EST condition parameter is expressive of an at least temporary lack of operability of the EST system, and if a vehicle situation (or vehicle condition) is identified which, in case of the at least temporary lack of operability of the EST system, belong to a predetermined group of vehicle situations defined as hazardous (e.g. vehicle situations which can be considered as potentially harmful situations).

According to at least one example embodiment, the EST system comprises an EST management system having an electronic control unit being configured to perform the method as described with reference to FIG. 3. The EST management system may e.g. be a battery management system. The method as described with reference to FIG. 3 may be implemented in a computer program. Thus, the computer program may comprise program code means for performing the method as described with reference to FIG. 3, when the program is run on a computer. Alternatively the method as described with reference to FIG. 3 may be implemented in a computer readable medium carrying a computer program comprising program code means for performing the method as described with reference to FIG. 3, when the computer program is run on a computer.

Turning back to FIGS. 1 and 2, the control unit 17, 117 may be configured to perform the method as described with reference to FIG. 3.

It should be noted that the naming of the steps not necessarily, but might according to at least one example embodiment, relate to the order in which the steps are carried out. Thus, the order of the steps may be different than that explained here, and the control unit 17, 117 of FIGS. 1-2 may be configured to carry out one or several of the steps. Moreover, one or more of the steps may be combined and carried out simultaneously.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any standard (such as ISO 26262) mentioned in the present application are to be based on instructions valid on the date of priority of the present application.

The invention claimed is:

1. A method for improving the availability of an energy storage or transformation, EST, system of a vehicle, the EST system comprising a plurality of EST devices, the method comprising:
providing an EST system model of coupled EST components of the EST system,
identifying a fault or error in an EST condition parameter of the EST system,
estimating an output value of the EST condition parameter based on the EST system model,
identifying a vehicle situation which, in case of an at least temporary lack of operability of the EST system, belong to a predetermined group of vehicle situations defined as hazardous, and
in response to identifying the vehicle situation belonging to the predetermined group of vehicle situations defined as hazardous, operating the EST system despite the fault or error in the EST condition parameter using the estimated output value of the EST condition parameter based on the EST system model.

2. The method according to claim 1, wherein the identified fault or error in the EST condition parameter results in an at least temporary lack of operability if the identified vehicle situation does not belong to the predetermined group of vehicle situations defined as hazardous.

3. The method according to claim 1, wherein the predetermined group of vehicle situations defined as hazardous comprises vehicle situations potentially resulting in personal injuries.

4. The method according to claim 1, wherein the identified vehicle situation belonging to the predetermined group of vehicle situations defined as hazardous has a predetermined vehicle risk level, and wherein the identified fault or error in the EST condition parameter of the EST system has a predetermined EST system risk level, wherein the step of operating the EST system despite the fault or error in the EST condition parameter by using the estimated output value of the EST condition parameter based on the EST system model is performed in response to that the risk level of the identified vehicle situation is higher than the risk level of the EST system.

5. The method according to claim 1, wherein the EST condition parameter is a measured parameter of a first sensor, and wherein identifying a fault or error in an EST condition parameter comprises identifying a fault or error in the measured parameter, and estimating the output value of the EST condition parameter comprises estimating an output value of the first sensor.

6. The method according to claim 5, wherein estimating the output value of the first sensor based on the EST system model comprises extrapolating or inferring the output value based on sensory measurement data of a neighbouring sensor to the first sensor, and/or sensory measurement data of a neighbouring coupled EST component to the coupled EST component associated with the first sensor.

7. The method according to claim 6, wherein the EST system comprises a plurality of sensors configured to measure at least one quantity and to provide the sensory measurement data, the first sensor being comprised in the plurality of sensors, and wherein each coupled EST component is associated with at least one sensor of the plurality of sensors.

8. The method according to claim 1, wherein the EST condition parameter is a parameter of an internal state of the EST system, and wherein identifying a fault or error in an EST condition parameter comprises identifying a fault or error in the internal state, and estimating an output value of the EST condition parameter comprises estimating an output value of the internal state.

9. The method according to claim 8, wherein the internal state of the EST system is at least one of the following, State-of-Charge, State-of-Power and State-of-Energy.

10. The method according to claim 8, wherein the fault or error in the parameter of the internal state is determined by comparing the internal state with a threshold value.

11. An EST management system comprising an electronic control unit being configured to perform the method according to claim 1.

12. An EST system of a vehicle comprising an EST management system according to claim 11.

13. A vehicle comprising an EST system according to claim 12.

14. The method according to claim 1, wherein the predetermined group of vehicle situations defined as hazardous comprises at least temporary lack of operability of the EST system.

* * * * *